UNITED STATES PATENT OFFICE.

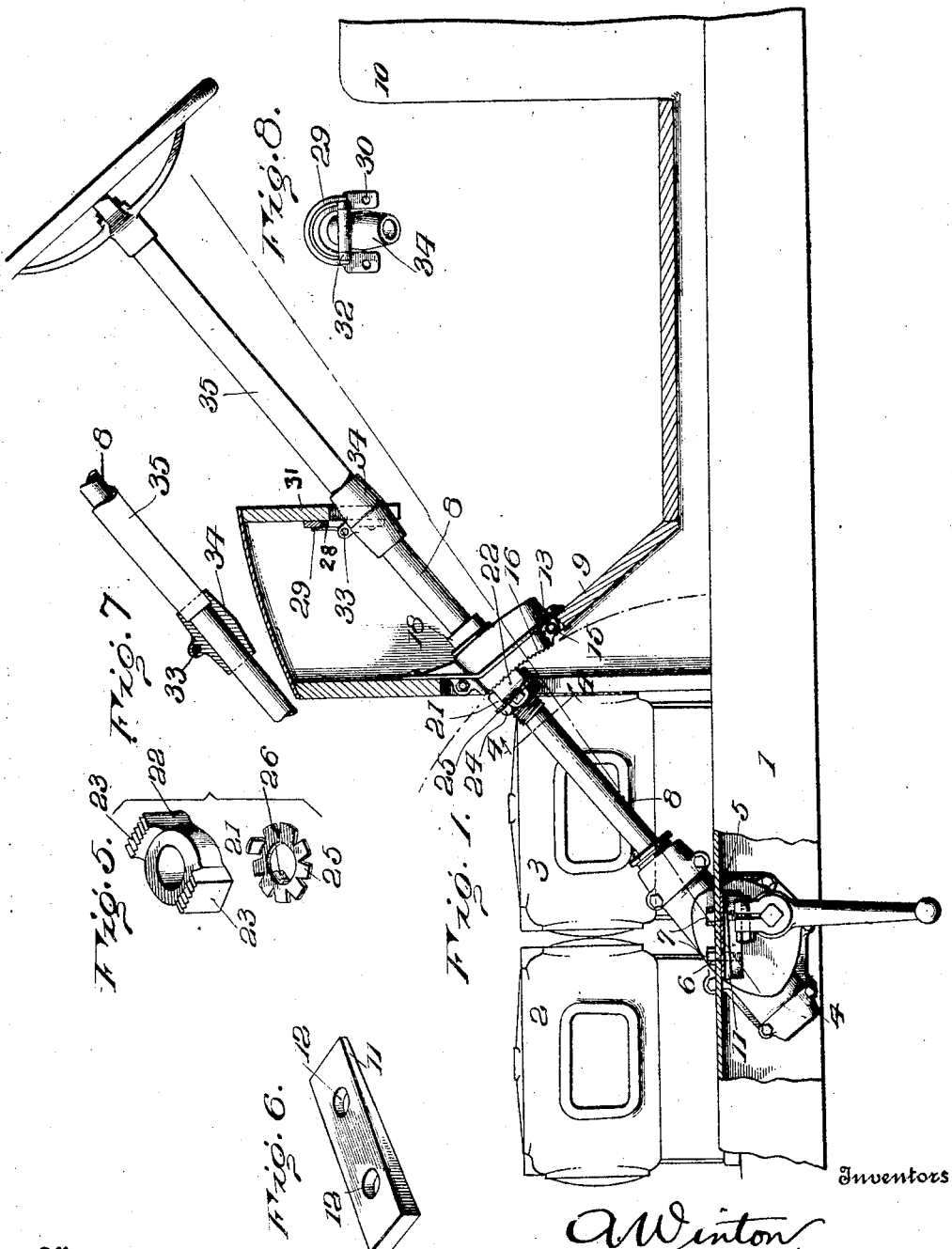

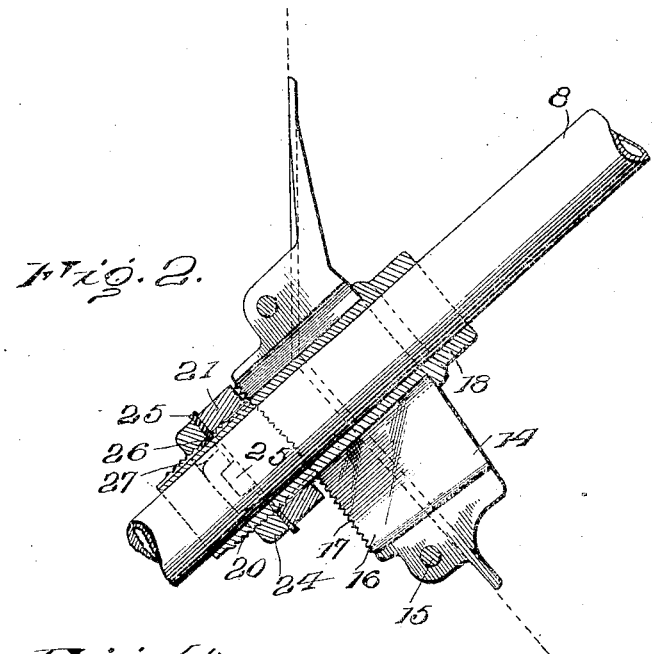
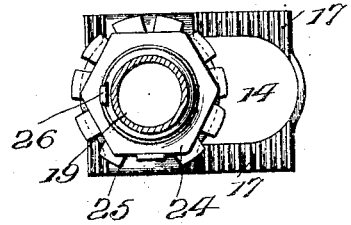
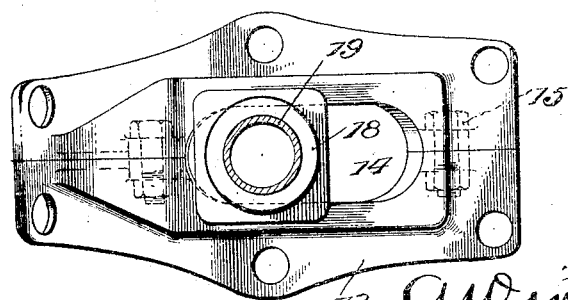

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

ADJUSTABLE STEERING-COLUMN FOR AUTOMOBILES.

1,125,621.   Specification of Letters Patent.   Patented Jan. 19, 1915.

Application filed June 12, 1913. Serial No. 773,367.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Adjustable Steering-Columns for Automobiles, of which the following is a specification, reference being had therein to the accompanying drawing.

The object of our invention is to provide a means whereby the steering column for an automobile steering wheel may be readily adjusted at different angles after it has been set up to accommodate the driver of the automobile.

Another object of our invention is to provide a simple, cheap and more effective device of this character having certain details of structure hereinafter more fully described.

In the accompanying drawing—Figure 1 is a longitudinal sectional view of the front part of an automobile, showing my improved steering column. Fig. 2 is an enlarged vertical sectional view showing the locking means for holding the steering column in its adjusted position to the floor. Fig. 3 is a top plan view of a main casting which is attached to the floor and dash of the automobile. Fig. 4 is a transverse sectional view taken on the line 4—4 of Fig. 1 and looking in the direction of the arrow. Fig. 5 is a detached perspective view of the locking plate and locking washer. Fig. 6 is a perspective view of the shim. Fig. 7 is a longitudinal sectional view showing the support for the upper end of the steering column. Fig. 8 is a plan view of the support shown in Fig. 7.

Referring now to the drawings, 1 represents the body of an ordinary automobile and 2 and 3 the engine cylinders in the hood. In the form of automobile to which my device is more especially designed, the frame is provided with a bracket, and one of the engine cylinders is also provided with a bracket on the same level and the steering gear case 4 is provided with lugs 5, which are secured to the bracket by means of the bolts 6 and 7. By this arrangement it will be seen that the steering gear case 4 is rigidly supported by the automobile frame. The steering column 8 extends upwardly from the steering gear case through the floor 9 of the automobile to a point adjacent the seat 10.

It has been found in automobiles that the position of this wheel is not exactly right for different operators and the manufacturers of automobiles are often required to change the position of the steering wheel. In order that the position of this wheel may be readily changed at any time to suit the purchaser of the car, we have provided this improved device.

As heretofore stated, the steering gear case 4 is rigidly supported by the frame of the car within the hood and the steering column is rotatably mounted therein and operates the steering gear. When it is desired to change the position or angle of the steering column 8, it is only necessary to remove the bolts 6 and 7 and place the tapering shim 11, between the brackets and the lugs on the steering gear case. This tapering shim, as shown in Fig. 6 of the drawing, is provided with openings 12 through which the bolts pass, and the angle at which the steering column is adjusted is governed by the thickness of the shim. When the shim has given the proper angle to the steering gear case, the same will be securely bolted in position by means of the bolts 6 and 7 and the steering column will extend upwardly through the floor 9 of the automobile at the proper angle. In order to provide for this adjustment of the steering column and at the same time provide a rigid connection between the same and the floor or body of the automobile, I employ a casting 13, which is bolted to the floor and dash of the automobile and is provided with an elongated opening 14. This casting, as shown in Fig. 3 of the drawing, is made of two sections so that it can be readily removed from around the steering column and the two sections are locked together by means of the bolts 15. The under face of this casting 13 is provided with a concaved surface 16, having serrations 17 on each side of the elongated opening 14. Extending through the casting 13 is a bushing 18, through which the steering column 8 passes and is free to rotate therein. The bushing 18, as shown in Figs. 2 and 3, is free to move within the opening 14 in the casting 13, whereby the steering column may be set at the desired angle by means of the tapered shim, as heretofore described.

The lower end of the bushing 18 is provided with a screw-threaded portion 20, below the casting 13, and loosely surrounding the bushing below the casting is a locking plate 21, having upwardly extending ears 22, provided with serrated extensions 23, extending beyond the face thereof and which are adapted to engage the serrations 17 of the casting 13. Screwed upon the threaded portions 20 of the bushing is a nut 24, and placed between the nut 24 and the locking plate 21 is a washer 25 having a tongue 26 entering the longitudinal groove 27 in the bushing, whereby the washer is held against rotation. The tightening of the screw 24 forces the locking plate 21 upwardly on the bushing, causing the serrated portions 23 to engage the serrated portions 17 of the casting and lock the bushing to the casting to hold the steering column 8 rigid in its adjusted position. The washer 25, as shown in Figs. 2 and 4 extends beyond the nut 24 and is adapted to be turned over the nut for locking the same in its locked position, whereby the nut is prevented from working loose.

In order that the steering column 8 above the floor 9 of the car may be additionally supported, we provide the support 28, which is formed of a horse-shoe shape, as indicated at 29, and which is provided with openings 30 by means of which the same is attached to the vertical portion 31 of the body of the car. The said support is provided with outwardly extending ears 32 in which is journaled the pin 33, carried by the sleeve 34, through which the steering column 8 loosely passes. By this structure it will be seen that the steering column is adjusted to the proper position and the horse-shoe shaped support is then bolted to the portion 31 of the car.

From the foregoing description it will be seen that we have produced a very simple, cheap and effective means whereby the steering column may be at any time adjusted to suit the purchaser of the automobile and requiring practically no change in the structure of the steering gear case or the column.

While we have shown and described this device as applied to a motor vehicle, it will be understood that it could be applied to a boat or an aeroplane, and while in the claims we will cover the same in combination with a vehicle, it must be understood that the word vehicle would cover any form of a conveyance.

The upper end of the sleeve 34 has rigidly secured thereto a tube 35, through which the steering column 8 passes. This tube extends to the steering wheel and forms a better finish to the column.

Having thus described our invention, what we claim and desire to secure by Letters Patent is:

1. In an automobile, a steering column adjustably bolted to a part of the automobile structure, a casting carried by a part of the automobile structure and through which the steering column passes, a bushing movable in the casting and surrounding the steering column, and means for locking the bushing in its adjusted position within the casting.

2. In an automobile, a steering column adjustably bolted to a part of the automobile structure, a casting carried by a part of the automobile structure and through which the steering column passes and having a serrated upper face, a bushing surrounding the steering column and passing through the casting, and a nut adjustably mounted upon the bushing for locking the same to the serrated face of the casting.

3. In an automobile, a steering column adjustably bolted to a part of the automobile structure, a casting carried by a part of the automobile structure and through which the steering column passes, a bushing surrounding the steering column and passing through the casting and a locking nut carried by the bushing and adapted to lock the bushing to the casting, substantially as shown and described.

4. In an automobile, a steering column adjustably secured to a part of the automobile structure, a casting carried by a part of the automobile structure and through which the steering column passes, a bushing surrounding the steering column within the casting, and means carried by the bushing for locking the same to the casting in its adjusted position.

5. In an automobile, a steering column adjustably secured to a part of the automobile structure, a casting carried by a part of the automobile structure and through which the steering column passes, a bushing surrounding the steering column and movable in the casting, means for locking the bushing to the casting, and means above the casting for rotatably supporting the steering column, substantially as shown and described.

6. In an automobile, a steering column secured to a part of the automobile structure, a means for adjusting the angle of the steering column, a plate secured to the automobile structure and having an elongated slot, a bushing within said slot and through which the steering column passes, said plate having a concaved serrated face, and a locking member on the bushing and having serrations meshing with the serrations of the plate.

7. In an automobile, a steering column secured to a part of the automobile structure, a means for adjusting the angle of the steering column, a plate secured to the automobile structure and having an elongated slot, a bushing passing through said slot and movable therein and through which the steering column passes, the said plate having a concaved serrated face, a locking member slidable on the bushing and having serrations meshing with the serrations of the plate, and a nut on the bushing for forcing the locking member into engagement with the serrated face of the plate.

8. In an automobile, a steering column secured to a part of the automobile structure, a means for adjusting the angle of the column, a plate secured to a part of the automobile structure and having an elongated slot, a bushing extending through said slot and movable therein and through which the steering column passes, said plate having serrations on the opposite sides of the slot, a locking member adjustable on the bushing and having a serrated portion engaging the serrations of the plate, a washer engaging the locking member and the bushing and locking the same together, a nut screwed upon the bushing and forcing the locking member in engagement with the serrations of the plate, substantially as shown and described.

9. In an automobile, a steering column secured to a part of the automobile structure, means for adjusting the column at different angles, a casting carried by a part of the automobile structure and through which the steering column passes, a bushing movable in the casting and surrounding the steering column, means for locking the bushing to the casting, a horseshoe-shaped plate adapted to straddle the steering column and attached to a part of the automobile structure, a sleeve extending between the arms formed by a horseshoe-shaped plate and through which the steering column passes and having pintles mounted in the arms of the horseshoe plate, substantially as shown and described.

10. In an automobile, a steering column secured to a part of the automobile structure, means for adjusting the angle of the column, a plate secured to a part of the automobile structure and having an elongated slot, a bushing extending through said slot and movable therein and through which the steering column passes, said plate having serrations on opposite sides of the slot, a locking member adjustable on the bushing and having serrated portions engaging the serrations of the plate, a nut for holding the locking member in its adjusted position, a horseshoe-shaped plate straddling the steering column and adapted to be rigidly secured to the automobile structure after the column has been moved in its adjusted position, a sleeve between the arms of the horseshoe shaped member and through which the steering column passes, and pintles carried by the sleeve and journaled in the arms of the horseshoe shaped member, substantially as shown and described.

11. In an automobile, a steering column adjustably secured to a part of the automobile structure, a casting carried by a part of the automobile structure and through which the steering column passes, means for holding the steering column in its adjusted position in the casting, and a pivoted bushing above the casting and supported by a part of the automobile structure through which the steering column passes.

12. In an automobile, a steering column adjustably secured to a part of the automobile structure, a plate secured to a part of the automobile structure and having an elongated slot, a bushing extending through said slot and movable therein and having a steering column passing therethrough, said plate having serrations on the opposite side of the slot, and a locking member adjustable on the bushing and having a serrated portion engaging the serrations of the plate.

In testimony whereby we hereunto affix our signatures in the presence of two witnesses.

ALEXANDER WINTON.
HAROLD B. ANDERSON.

Witnesses:
  W. J. WARD,
  BYRON B. BROCKWAY.